United States Patent [19]

Roncelli, deceased et al.

[11] Patent Number: 4,747,278

[45] Date of Patent: May 31, 1988

[54] SHIFT LOCK

[75] Inventors: Paul E. Roncelli, deceased, late of Birmingham; Bernadette Roncelli, personal representative, 4630 W. Maple, Birmingham, both of Mich. 48010

[73] Assignee: Bernedette M. Roncelli, Birmingham, Mich.

[21] Appl. No.: 102,772

[22] Filed: Sep. 23, 1987

Related U.S. Application Data

[63] Continuation of Ser. No. 741,960, Jun. 6, 1985, abandoned.

[51] Int. Cl.$^4$ .................... F16H 57/00; G05G 5/00; G05G 1/08
[52] U.S. Cl. .......................................... 70/201; 70/34; 70/187; 74/538
[58] Field of Search ............... 70/201, 203, 187, 231, 70/34, 181, 182, 222; 74/535, 538, 523, 543, 475; 403/378, 379; 24/673, 676

[56] References Cited

U.S. PATENT DOCUMENTS

| | | | |
|---|---|---|---|
| 962,448 | 6/1910 | Miller | 70/201 |
| 999,462 | 8/1911 | Miller | 70/201 |
| 1,198,341 | 9/1916 | Geery | 70/201 |
| 1,235,035 | 7/1917 | Jensen | 70/201 |
| 1,552,408 | 9/1925 | Anderson | 70/201 |
| 1,552,410 | 9/1925 | Anderson | 70/201 |
| 1,552,411 | 9/1925 | Anderson | 70/201 |
| 1,552,412 | 9/1925 | Anderson | 70/201 |
| 1,557,911 | 10/1925 | White | 70/201 |
| 1,638,688 | 8/1927 | Fipps | 70/201 |
| 1,662,099 | 3/1928 | Anderson | 70/201 |
| 1,710,452 | 4/1929 | Drolette et al. | |
| 1,733,245 | 10/1929 | Snelling | 70/201 |
| 1,741,990 | 12/1929 | Johnson | 70/201 |
| 1,752,463 | 4/1930 | Smythe et al. | 70/201 |
| 1,859,328 | 5/1932 | Cobb, Sr. | 70/201 |
| 1,866,309 | 7/1932 | Johnson | 70/201 |
| 1,888,728 | 11/1932 | Johnson | 70/201 |
| 2,303,241 | 11/1942 | Taman | 70/187 |
| 3,136,149 | 6/1964 | Klein | 70/187 |
| 3,431,755 | 3/1969 | Eisenman | 70/181 |
| 3,583,184 | 6/1971 | Papale | 70/201 |
| 3,710,606 | 1/1973 | Prince | 70/203 |
| 3,796,464 | 3/1974 | Hansen et al. | 403/378 |
| 3,817,065 | 6/1974 | Sander . | |
| 4,078,447 | 3/1978 | Kato et al. | 74/538 |
| 4,231,241 | 11/1980 | Lipski | 70/201 |
| 4,362,035 | 12/1982 | Vitale | 70/222 |
| 4,365,522 | 12/1982 | Kubota et al. | 74/538 |
| 4,619,122 | 10/1986 | Simpson | 70/34 |

FOREIGN PATENT DOCUMENTS

| | | | |
|---|---|---|---|
| 55-119717 | 9/1980 | Japan | 74/538 |
| 7712925 | 11/1979 | Sweden | 70/34 |
| 1237205 | 6/1971 | United Kingdom | 74/535 |
| 1486114 | 9/1977 | United Kingdom | 74/538 |

Primary Examiner—Gary L. Smith
Assistant Examiner—Vinh Luong
Attorney, Agent, or Firm—Harness, Dickey & Pierce

[57] ABSTRACT

A vehicle shift lever locking mechanism for retrofitting to motor vehicles includes in one form a universal adapter to enable the locking mechanism to be fitted to shift levers of a wide variety of motor vehicles. The universal adapter is received at least in part within a handle and a locking assembly is also received in part within the universal adapter and the handle so as to mechanically interlock the components in assembled relationship. The handle is designed to overlie the fastening arrangement which secures the universal adapter to the shift lever and thus prevents unauthorized removal of the locking mechanism. Embodiments of the locking mechanism are suited for either cable or rod actuated shift mechanisms. In another form the locking mechanism is formed for attachment to a steering column shift mechanism and includes a lock assembly movable within a housing mounted on the steering column to a position in which the lock assembly prevents pivotal releasing movement of the shift lever.

16 Claims, 4 Drawing Sheets

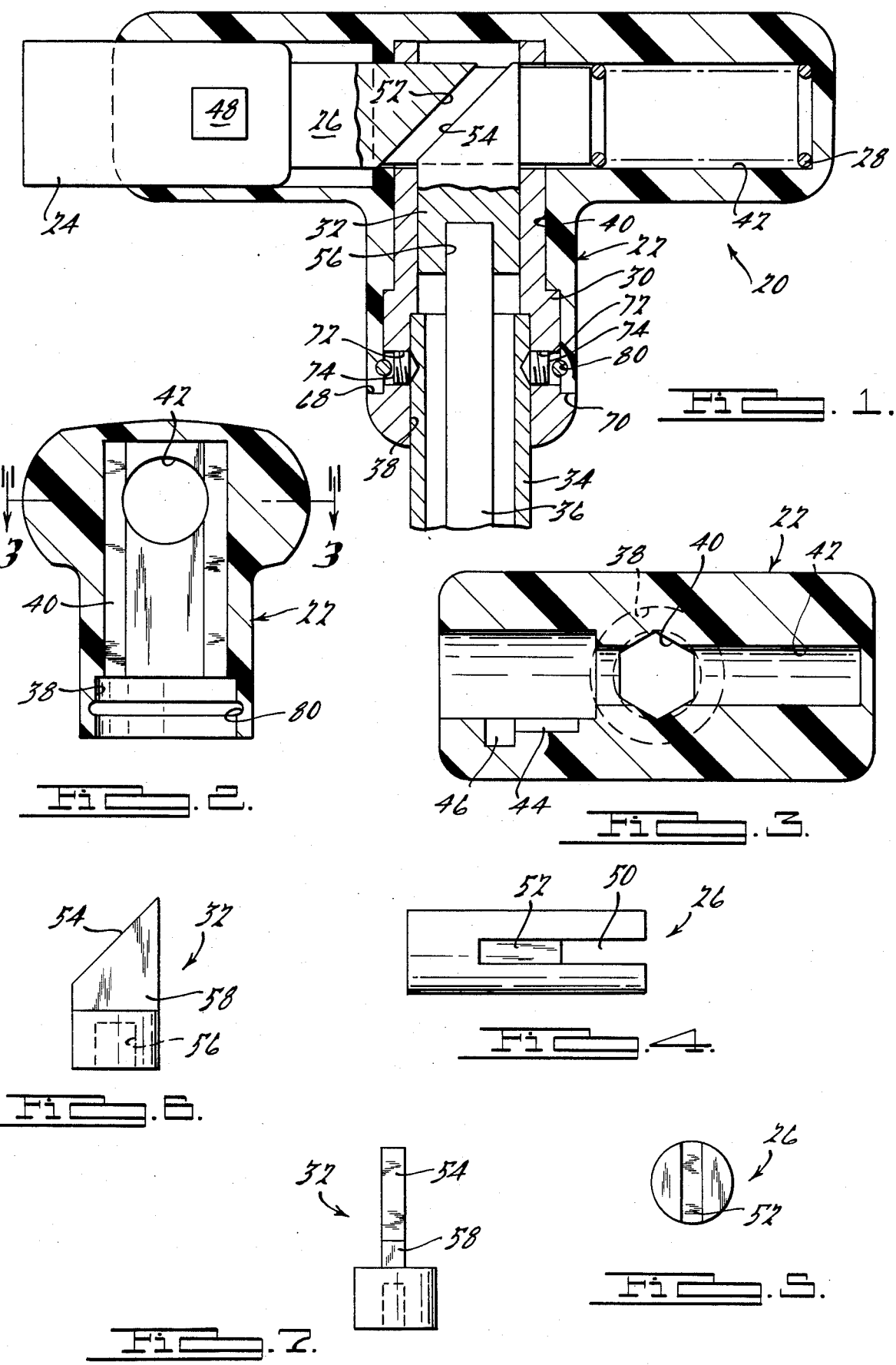

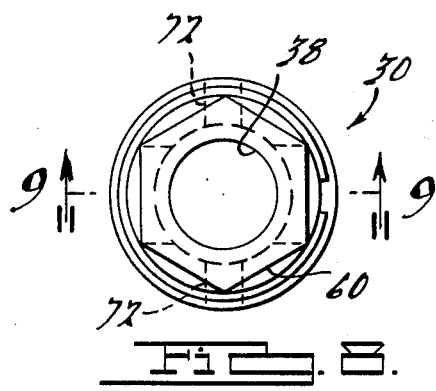
FIG. 8.
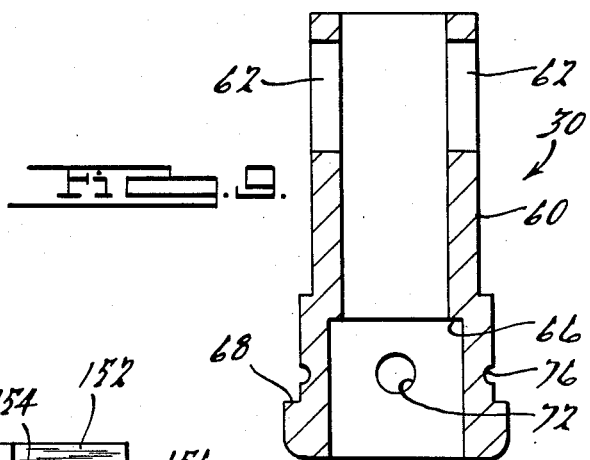
FIG. 9.
FIG. 15.
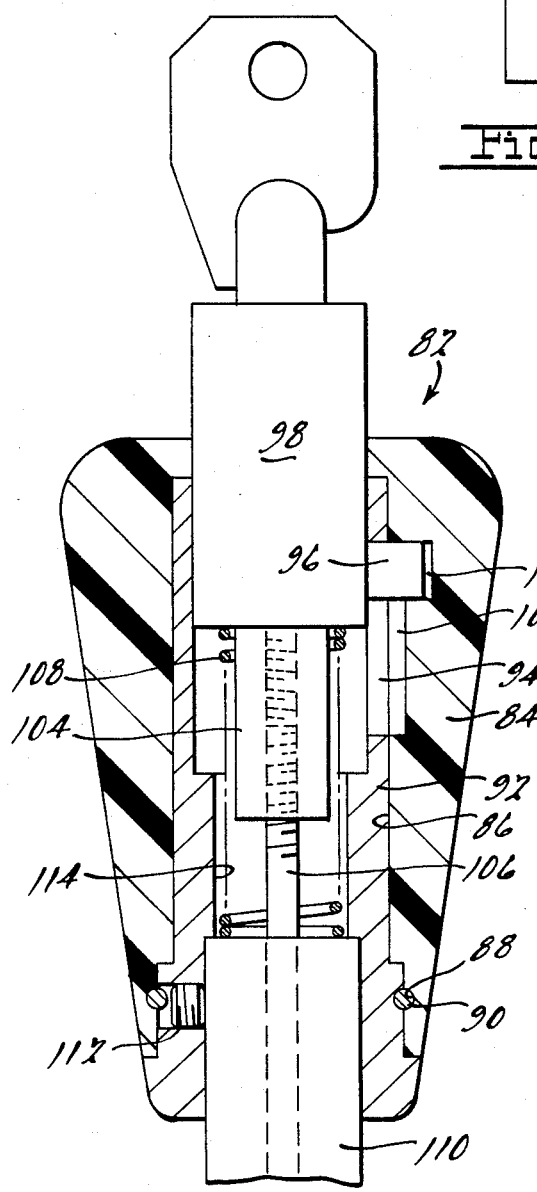
FIG. 13.
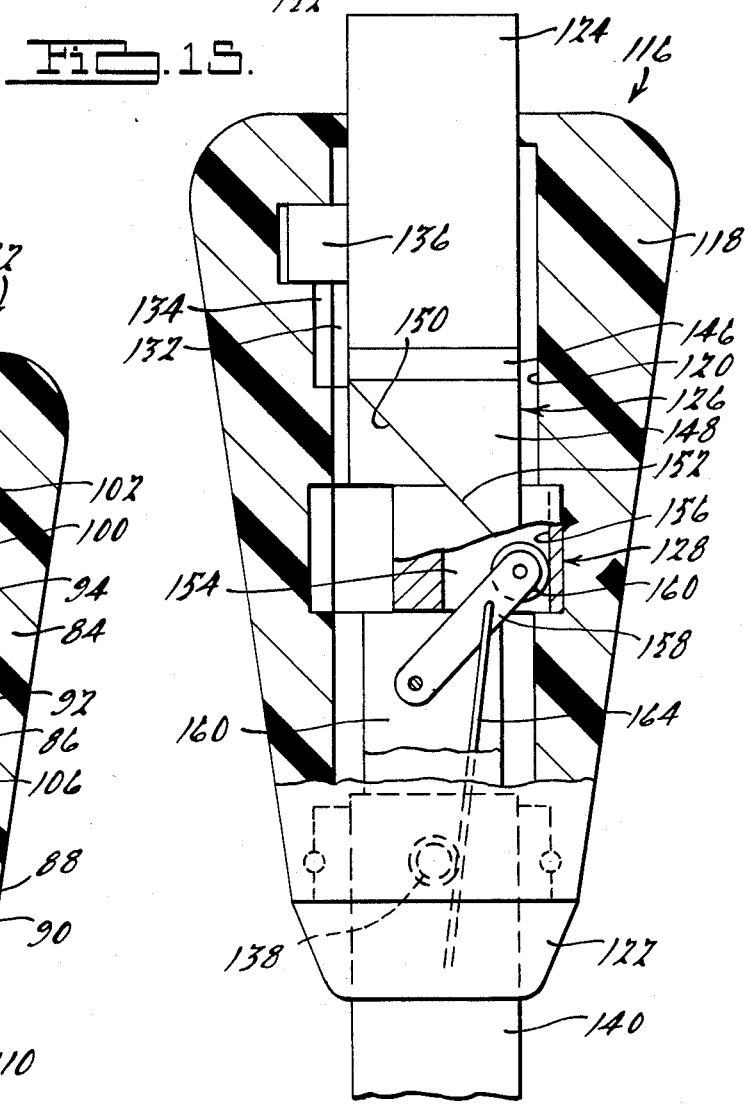
FIG. 14.

SHIFT LOCK

This is a continuation of U.S. patent application Ser. No. 741,960, filed June 6, 1985, now abandoned.

BACKGROUND AND SUMMARY OF THE INVENTION

The present invention relates generally to vehicle anti-theft devices and more particularly to apparatus adapted to prevent actuation of the vehicle gear selector.

Theft of motor vehicles is a subject of great concern to the entire population and has a direct effect not only on the victims of such crimes but also on all who own vehicles as it directly impacts on the costs we all must pay for insurance against such happenings. Accordingly, much effort has been directed to providing means by which such thefts may be prevented or at least substantially reduced in frequency.

While it is virtually impossible to provide means to totally prevent the possibility of theft of a motor vehicle, it is possible to provide means which render such a task sufficiently difficult and time consuming as to substantially discourage the thieves. One approach generally incorporated in modern day motor vehicles comprises means for locking the vehicle steering wheel when the ignition is switched to an off position. Also, such systems may incorporate therein means for locking the shift lever in position as well. However, such systems are both actuated by and dependent only upon the ignition lock mechanism and may thus be defeated simultaneously.

Accordingly, the present invention provides an auxiliary locking system particularly designed to independently lock the vehicle shift lever in a desired position thereby providing an entirely separate system which must be defeated by a potential thief before the vehicle may be driven away. The present invention is particularly well suited for the aftermarket being designed in such a manner that an individual may easily install it himself thus enabling individuals to increase the difficulty of theft of their vehicle and thereby encourage the would-be thief to look elsewhere for a vehicle not so equipped.

In one form, the present invention comprises an acutating handle assembly containing a key actuated lock means which is designed to be installed in place of the existing shift lever handle on those vehicles employing a pushbutton release for actuation thereof. Such pushbutton release mechanisms are commonly employed on vehicles wherein the shift lever is mounted on the center console. The present invention may be in the form of either a T or bell-shaped handle assembly and may be designed for either cable or rod actuated release mechanisms. An adapter member is provided which is designed to be securely fastened to the vehicle shift lever and thereafter is mechanically interlocked with the lock cylinder in such a manner as to effectively prevent removal or disassembly of the apparatus without totally destroying same. The adapter member is designed in such a manner that the present invention may be easily and conveniently manufactured for use on virtually any vehicle by merely altering the size of the bore provided therein and into which the vehicle shift lever is inserted. The remaining portions of the locking assembly of the present invention may all be of a standard size and shape thus facilitating the application of the present invention to the wide variety of vehicles which must be accommodated in aftermarket accessories without requiring the cost penalty necessary to design and manufacture totally different assemblies for each vehicle on the market.

Another embodiment of the present invention is particularly designed for use in preventing operation of steering column mounted shift levers. In the embodiment, a housing is provided which is designed to be secured to the shift lever and carries a locking cylinder which cooperates with another housing member secured to the steering column. A spring biased plunger is operated by the locking cylinder so as to selectively prevent the pivotal movement of shift lever required to release it from its latched position. The means for securing both of the housings are completely concealed when the apparatus is installed thereby effectively preventing removal of the apparatus. Further, the lever mounted housings includes portions overlapping the column mounted housing so as to thereby effectively prevent insertion of prying devices which could be used to break the apparatus. Thus, this embodiment also provides a relatively simple locking device which may be easily manufactured and installed and serves as an effective deterrent to prevent or substantially reduce the likelihood of theft of the vehicle upon which it is installed.

Additional advantages and features of the present invention will become apparent from the subsequent description and the appended claims taken in conjunction with the accompanying drawings.

BRIEF DESCRIPTION OF THE DRAWINGS

FIG. 1 is a section view of a T-type locking shift handle assembly in accordance with the present invention, the section being taken along a radial plane extending along the axis of the shift lever.

FIG. 2 is a section view of the handle forming a part of the assembly of FIG. 1, the section also being taken along a radial plane extending along the axis of the shift lever but shifted 90° from the section of FIG. 1.

FIG. 3 is a section view of the handle of FIG. 2, the section being taken along line 3—3 thereof;

FIG. 4 is a detail side elevational view of the plunger of the present invention.

FIG. 5 is a detail end elevational view of the plunger of FIG. 4.

FIGS. 6 and 7 are detail side elevational views of the cam actuating member of the present invention.

FIG. 8 is a top view of the universal adapter forming a part of the present invention.

FIG. 9 is a section view of the adapter of FIG. 8, the section being taken along line 9—9 thereof;

FIG. 13 is a section view similar to that of FIG. 1 but showing a bell handle type locking shift handle assembly in accordance with the present invention.

FIG. 14 is another section view similar to that of FIGS. 1, 10 and 13 but showing another embodiment of the present invention adapted for use in cable actuated shifting mechanisms.

FIG. 15 is a detailed view of the cam member forming a part of the embodiment of FIG. 14.

DESCRIPTION OF THE PREFERRED EMBODIMENTS

Figure 10:
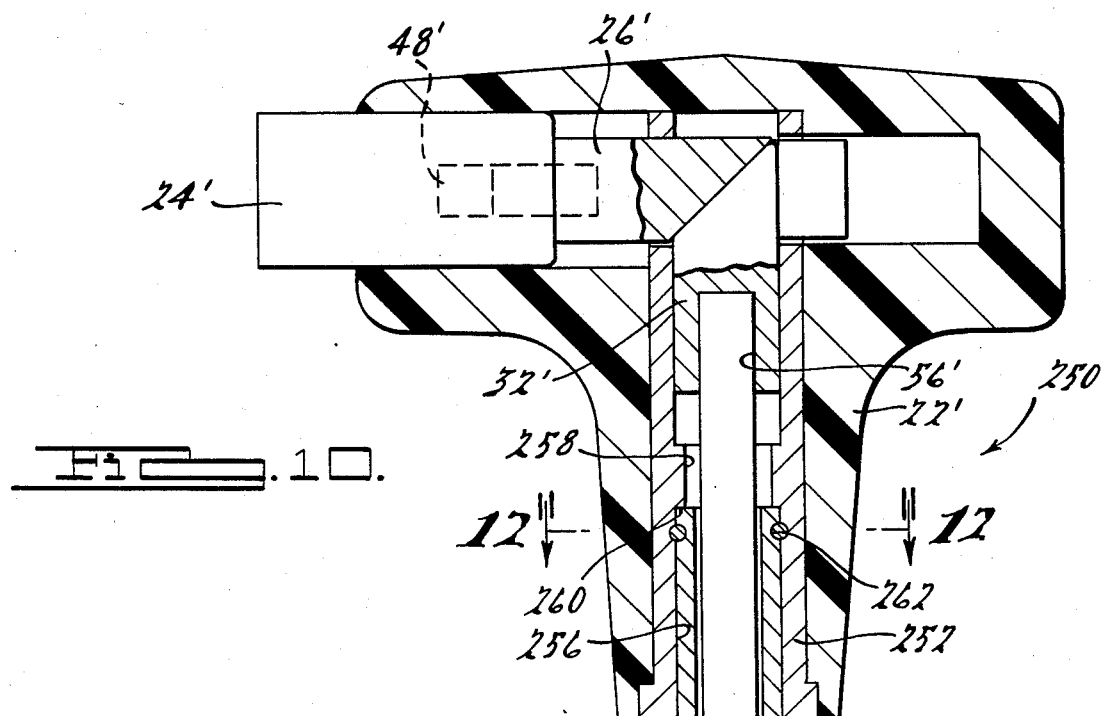
FIG. 10 is a view similar to that of FIG. 1 but showing another embodiment of the present invention.

Referring now to the drawings and in particular to FIGS. 1 through 9, there is shown a T-type locking shift handle assembly in accordance with the present invention being indicated generally at 20. Locking shift handle assembly 20 includes a generally T-shaped handle member 22 within which are disposed a locking cylinder member 24 projecting radially outwardly from one side thereof and a plunger member 26 movably disposed within the handle 22 which is spring biased to the left by means of helical coil spring 28. A universal adapter member 30 is also provided fitted within handle 22 and has a cam actuator member 32 movably disposed therein. As shown, universal adapter 30 is suitably sized so as to telescopically receive the tubular shift lever 34 within which is disposed the actuating rod 36. Cam actuating member 32 is designed to engage the terminal end of rod 36 and to cooperate therewith so as to allow downward actuating movement thereof.

Handle member 22 is preferably fabricated from a suitable polymeric composition and may be formed in any convenient manner such as by injection molding. Preferably handle member 22 will be suitably sized so as to provide for comfortable engagement by an operator's hand. As shown, a generally vertically extending bore extends upward from the lower end (as shown) and includes a generally circular-shaped enlarged diameter lower portion 38 and a generally hexagonal-shaped upper portion thereof 40. While upper portion 40 is shown as being hexagonal in shape, it should be noted that any non-circular configuration may be imparted thereto so as to inhibit relative rotational movement between the universal adapter 30 and the handle member 22. A laterally extending bore 42 intersects upper end portion 40 and opens outwardly at one end of the T-handle member 22. As shown in FIG. 1, the left side of the laterally extending bore 42 is of an enlarged diameter and suitably sized so as to movably accommodate lock cylinder 24. A relatively small axially extending slot 44 is provided in the sidewall of the enlarged diameter portion of the laterally extending bore 42 and includes an enlarged section 46 adjacent the outer end thereof. Slot 44 is designed to accommodate a radially outwardly projecting tab portion 48 provided on the lock cylinder with enlarged section 46 cooperating therewith to secure lock cylinder 24 in an extended condition.

A generally cylindrically shaped axially elongated plunger member 26 is movably positioned within the laterally extending bore having one end bearing against the inner end of lock cylinder 24. The opposite end of plunger member 26 engages helical coil spring 28 and is biased thereby against the lock cylinder 24. A generally diametrically extending slot 50 is provided extending inwardly from the end of plunger 26 which engages spring 28 and terminates approximately midway in an inclined ramp or surface 52 which is adapted to be engageable with a suitably inclined surface 54 of cam actuating member 32.

As shown in FIGS. 1, 6 and 7, cam actuating member 32 is generally cylindrical in shape and includes a relatively small diameter bore 56 extending inwardly from the bottom surface thereof, which bore is designed to telescopically receive rod member 36. A diametrically extending flange portion 58 extends axially outwardly from the other end of cam actuating member 32 and includes an inclined ramp or surface 54 at the upper end thereof which is adapted to cooperate with the inclined ramp or surface 52 provided within plunger member 26.

A universal adapter 30 is also provided which is specifically designed to enable the T-handle assembly to be used on vehicles having a wide variety of different sized shift lever tubes 34. Universal adapter 30 has a generally hexagonal or other non-circularly shaped upper portion 60 which is designed to be received within the complementary shaped upper portion 40 of the bore provided in handle member 22. A diametrically extending bore 62 is provided within universal adapter member 30 adjacent the upper end thereof which is suitably sized so as to accommodate plunger member 26 which extends therethrough. A longitudinally extending bore 62 is also provided within universal adapter member 30 which is designed to movably accommodate cam actuating member 32. The lower end portion 64 of longitudinally extending bore 62 is of a slightly enlarged diameter which is suitably sized so as to enable shift tube 34 to be received therein. Inward telescopic movement of shift tube 34 is limited by shoulder 66 which delineates the enlarged diameter portion 64 of the longitudinally extending bore 62. In order to provide sufficient material thickness in the area surrounding the enlarged diameter portion 64 of longitudinally extending bore 62 so as to allow it to be varied in size without altering the other dimensions of universal adapter 30, the outer surface of universal adapter member 30 is stepped radially outwardly within this area and is generally circular in cross section. A further radial outwardly extending step 68 is provided adjacent the lower end of universal adapter 30 and is designed to provide a seating surface for the lower end 70 of T-handle member 22. A pair of diametrically opposed threaded bores 72 are provided in universal adapter member 30 opening into the enlarged diameter portion 64 of the longitudinally extending bore 62. A pair of suitable threaded set screws 74 are provided within these openings and are operative to secure the universal adapter to the shift tube 34. An annular groove 76 is also provided extending circumferentially around the universal adapter adjacent the lower end within which is disposed a suitable snap ring 78. A complementary shaped annular groove 80 is provided within the adapter receiving bore 40 of shift handle 22 and operates to receive the annular spring member 78 and to cooperate therewith so as to prevent relative axial movement of the handle member 22 with respect to the adapter 30.

In order to install the T-type locking shift handle assembly 20 on a motor vehicle, it is first necessary to remove the existing shift handle assembly. Thereafter, the universal adapter 30 is slid over the shift tube 34 until the shift tube 34 engages the stepped shoulder 66 provided therein. Thereafter set screws 74 may be tightened down so as to secure the universal adapter to the shift tube 34. The cam actuating member 32 is then inserted within the upper longitudinally extending bore of the universal adapter and seated upon the upwardly projecting rod member 36. Next the handle member 22 with biasing spring 28 positioned therein is slid over the universal adapter until the annular groove 80 provided in the lower end 38 of the bore engages the snap ring 78. Thereafter the plunger member 26 is inserted through the open end of the laterally extending bore 42 followed by the lock cylinder 24. In order to insert the lock cylinder 24, the spring biased radially outwardly projecting tab 48 is manually depressed so as to provide clearance for the cylinder 24 to be inserted within the enlarged diameter portion of the radially extending bore. As the lock cylinder 24 is moved axially inwardly into the bore, this radially extending tab portion 48 will spring outward as it is moved into the open area provided by the slot 44 in the sidewall portion of this bore.

In order to operate the release mechanism of the present invention, the operator will push the lock cylinder 24 laterally inwardly with respect to handle member 22 which in turn will move plunger member 26 laterally inwardly against the spring biasing pressure of helical coil spring 28. Inclined surface 52 provided on the plunger member 26 will engage the correspondingly inclined surface 54 of cam actuating member 32 thereby effecting a downward movement thereof, which movement will be transferred to the actuating rod 36 of the vehicle shift mechanism. Upon release of pressure applied to lock cylinder 24, spring 28 will bias the lock member and associated plunger laterally outwardly with respect to the handle member thereby enabling cam actuating member 32 to move upwardly. When in a locked position, lock cylinder 24 will be in an outwardly biased position and the tab member 48 projecting radially outwardly therefrom will be received in the enlarged portion 46 of the axially extending slot provided in the sidewall of the receiving bore. When in this position, it will be impossible for an individual to depress lock cylinder 24 and thus release or actuation of rod member 36 will be effectively prevented.

It should be noted that removal of handle member 22 from the lock assembly 20 once installed and in a locked position will be effectively prevented due to the presence of plunger member 26 which extends diametrically through the opening 62 provided in the upper end of the universal adapter 30. Further, the handle member 22 overlies the set screws 74 provided in the lower end portion of the universal adapter and thus effectively prevents access thereto so as to prevent removal of the universal adapter along with the assembled locking handle assembly. It should also be noted that in order to adapt the T-handle shift lock assembly 20 of the present invention to virtually any vehicle, the only change required is the sizing of the enlarged diameter portion 64 of the longitudinally extending bore 62 provided in the universal adapter. This may be easily accomplished by merely changing the size and/or shape of the core member utilized in the casting of the universal adapter or by suitable machining operations. Thus the present invention provides a locking shift handle assembly which may be easily adapted to fit a wide variety of vehicles and will operate to provide an effective theft deterrence therefor.

Figure 11:
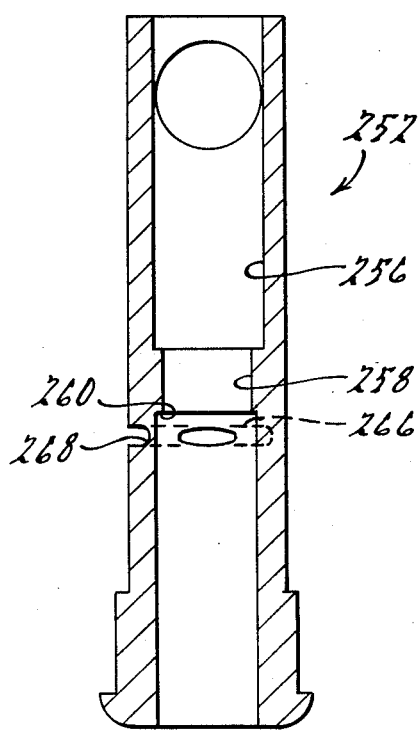
FIG. 11 is a view of the adapter incorporated in the embodiment of FIG. 10.
Figure 12:
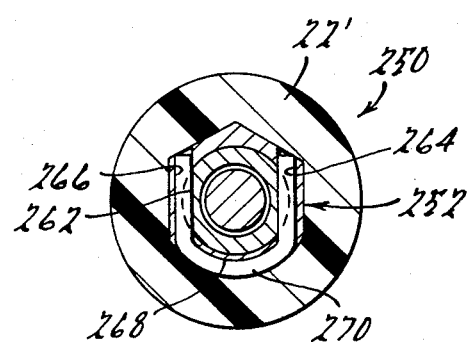
FIG. 12 is a section view of the embodiment of FIG. 10, the section being taken along line 12—12 thereof.

Another embodiment of a T-type locking shift handle assembly is illustrated in FIGS. 10–12 being indicated generally by reference number 250. Shift handle assembly 250 is similar to assembly 20 described above with the exception that biasing spring 28 has been deleted and universal adapter member 252 is secured to tubular shift lever 254 in a different manner as hereinafter described. Accordingly, except as noted above, corresponding portions of shift handle assembly 252 are indicated by the same reference numbers utilized in conjunction with the embodiment of FIGS. 1–9 primed and further description thereof is not necessary.

Universal adapter 252 is similar to adapter 30 having an elongated generally cylindrical shape with a bore 256 extending longitudinally therethrough. Bore 256 is designed to telescopically receive shift tube 254 and has a reduced diameter portion 258 which defines an axially facing shoulder 260 engageable with the end of tube 254 to limit inward telescopic movement thereof. In this embodiment, shift tube 254 has an annular groove 262 provided on the outer periphery thereof adjacent the upper end. Adapter 252 is also provided with a pair of generally parallel chordally extending openings 264, 266, portions of which are designed to open into bore 256 in aligned relationship with groove 262. The outer ends of openings 264 and 266 are inteconnected by a relatively short circumferentially extending groove 268. A generally U-shaped staple member 270 is inserted into openings 264, 266 and the legs thereof are partially received within annular groove 262 so as to retain adapter 252 in assembled relationship with shift tube 254. This retaining arrangement is less costly to manufacture than the set screws employed in conjunction with shift handle lock assembly described above and is well suited for use in such vehicles wherein the shift tube 34' is provided with an annular groove.

The remaining components of shift handle assembly 250 are assembled in the same manner as described above in conjunction with shift handle assembly 20 except that handle member 22' is designed to be press fitted onto adapter member 252 thereby eliminating the need for a separate snap ring and groove associated therewith. Further, it is noted that in most vehicles actuating rod 36' is biased in an upward direction. Thus, in this embodiment, spring 28 has been deleted and return movement of locking cylinder member 24' and associated plunger member 26' is effected by upward return movement of actuating rod 36' via cam actuator member 32'.

Referring now to FIG. 13, there is shown an embodiment 82 of the present invention which is designed in the form of a bell-shaped shift handle assembly. In this embodiment, a generally bell-shaped shift handle member 84 is provided which has a bore 86 extending longitudinally therethrough. The lower end portion of this bore is similar in shape to bore 40 provided in the T-handle member 22 and incudes an annular groove 88 which is designed to cooperate with a suitable lock ring member 90 provided on the universal adapter member 92. Universal adapter member 92 is similar to universal adapter member 30 utilized in conjunction with the T-handle assembly 20 although in this embodiment a longitudinally extending slot 94 is provided in the sidewall thereof in place of a diametrically extending bore 62 provided adjacent the upper end. This longitudinally extending slot 94 is designed to accommodate the radially outwardly projecting tab portion 96 provided on the lock cylinder 98. The upper portion of bore 86 provided in the handle member 84 is also provided with an axially extending slot 100 opening at its upper end into an enlarged portion 102 which is designed to receive the radially extending tab 96 of the lock cylinder 98 in like manner as was described with reference to the slot 44 of the T-handle member 22. In this embodiment, the inner end portion of the lock cylinder bears against a generally cylindrically shaped adapter member 104 which is designed to be threaded onto the actuating rod 106 of the shift mechanism. A helical coil spring 108 surrounds the adapter and bears against the upper end of the vehicle shift tube 110 and operates to bias the lock cylinder outwardly with respect to handle member 84. It is thus apparent that in this embodiment the radially extending tab portion 96 of lock cylinder 98 and universal adapter 92 cooperate with each other to prevent removal of the handle member 84 surrounding the universal adapter and thus effectively prevent access to the set screws 112 by which the universal adapter 92 is secured to the shift tube 110. Further, it is noted that the universal adapter 92 of this embodiment may also be easily suitably sized to accommodate shift tubes of varying diameters by merely changing the size and/or shape of the core member used to form the lower end of bore 114 when casting same or alternatively by suitable machining operations.

While the embodiments of FIGS. 1–13 have all been directed to shift mechanisms employing rod actuated releases, many vehicles utilize cable type release mechanisms. Accordingly, an embodiment of the present invention which is particularly well sited for use with such cable systems is illustrated and will be described with reference to FIG. 14 being indicated generally at 116.

Lock assembly 116 comprises an elongated handle member 118 having a longitudinally extending bore 120 provided therein which is adapted to receive a universal adapter member 122, lock cylinder 124, plunger 126, actuating cam 128 and roller cam 130.

As shown therein, universal adapter 122 is similar to universal adapter 92 shown in FIG. 10 and extends inwardly from the lower end of handle member 118 for substantially the entire length of bore 120 terminating adjacent the upper end thereof. An axially elongated slot 132 is provided in the sidewall of adapter 122 and is designed to be positioned in aligned relationship with a longitudinally extending slot 134 provided in the sidewall of bore 120 provided in handle member 118 so as to accommodate the radially outwardly projecting locking tab 136 provided on the lock cylinder 124. The lower end of universal adapter 122 is substantially the same as described above the reference to adapters 92 and 30 and includes set screws 138 for securing same to shift tube 140 and an annular groove 142 containing snap ring 144 which is designed to aid in eliminating longitudinal play betwen handle member 118 and adapter member 122.

Plunger member 126 comprises a generally circularly shaped upper flange portion 146 engaging the inner end of lock cylinder 124 from which a pair of spaced legs 148 extend in a downward direction. Each of the legs has provided thereon an inclined camming surface 150 designed to engage and cooperate with comparably shaped upwardly facing spaced surfaces 152 on actuating cam 128.

Actuating cam 128 is laterally movable with respect to handle member 118 and universal adapter 122 each of which includes diametrically opposed recess openings provided therein to allow extended lateral movement of cam 128. A center opening 154 is provided in actuating cam 128 being defined in part by end wall 156.

A pivot arm 158 has one end pivotably supported on an extension portion 160 of the vehicle shift lever and includes a roller cam 162 mounted on the other end. Roller cam 162 is positioned within opening 154 in actuating cam 128 and in engaging relationship with end wall 156. The vehicle shift release cable 164 is also secured to pivot arm 158 adjacent roller cam 162.

In operation, downward movement of lock cylinder 124 and associated plunger 126 will operate through engaged cam surfaces 150, 152 of the plunger 126 and actuating cam 128 to effect lateral movement of the actuating cam 128 to the left as seen in FIG. 11. This lateral movement will in turn effect a pivotal movement of pivot arm 158 as roller cam 162 moves upwardly along end wall 156. This action in turn will exert a pulling action on the cable 164 thereby releasing the shift mechanism. In order to secure the lock assembly against operation, lock cylinder 124 may be actuated by suitable means such as a key to extend radially projecting tab 136 into the deeper portion of slot 134 provided at the upper end thereof thus preventing depression of the lock cylinder 124.

It should be noted that similarly to that described above, radially projecting tab portion 136 of lock cylinder 124 projects through the universal adapter 122 and thereby prevent removal of the lock assembly 116. Because of the time and effort required to destroy the lock device of the present invention, the likelihood of a would-be thief being detected and for police notified is increased, and potential thieves are encouraged to seek other vehicles not so equipped. Also, as previously noted, this embodiment may also be fitted to a wide variety of vehicles employing cable operated release mechanisms by merely selecting a universal adapter having an appropriately side shift tube receiving bore. Thus, it is not necessary for retailers to stock separate complete assemblies for each type of vehicle but rather universal adapters suitable for the various applications may be stocked independently of the complete assemblies thereby substantially reducing the cost of inventory required to accommodate a wide variety of vehicles.

While the above described embodiments are well suited for use in conjunction with vehicles employing a pushbutton type shift lever release mechanism, many vehicles do not employ such mechanisms but rather employ a steering column mounted shift lever which is released by moving the lever toward the steering wheel. An embodiment of the present invention which is specifically designed for such applications is illustrated and will be described with reference to FIGS. 16 and 17.

As shown, a shift lever lock assembly 166 is illustrated being shown in operative relationship to a shift lever 168 pivotably secured to a steering column 170. Lock assembly 166 comprises a first housing 172 which is designed to be secured to the steering column 170 by means of the shift lever pivot pin 174. Housing 172 may be fabricated from either a suitable polymeric composition or of metal and will preferably be of a one piece construction. Preferably, housing 172 will have an irregular shape generally as shown which includes an inwardly facing surface 176 contoured to complement the shape and contour of the steering column 170 with portions thereof extending both circumferentially and axially of the shift lever mounting forks 178 and a recess 180 to accommodate these mounting forks. An opening 182 extends through housing 172 which is designed to be positioned in coaxial relationship with the bore 184 in the mounting forks 178 and is designed to receive an elongated pivot pin 174 whereby the housing 172 may be secured to the steering column 170. A generally planar radially outer surface 188 is also provided having an opening 190 therein through which the shift lever 168 projects and an inwardly extending recess 192 offset therefrom. Preferably, opening 190 will be sized so as to allow for pivotal movement of the shift lever 168.

A second housing 194 is also provided which is designed to be secured to and move with the shift lever 168. Second housing 194 includes a peripheral flange portion 196 which is designed to closely surround the outer portion of housing 172 so as to prevent insertion of a pry tool such as a screw driver or the like into the area between the two housings. A bore 198 is provided extending inwardly from the outer surface of housing 194 which is designed to movably accommodate a suitable lock cylinder 200 and associated plunger 202 engaged therewith. A reduced diameter opening 204 is provided in the inner surface 206 of housing 194 through which the reduced diameter forward end portion 208 of plunger 202 projects and is positioned generally coaxially with an forms an extension of bore 198. The surrounding annular shoulder 210 provides a seat for one end of a helical coil spring 212, the other end of which bears against an annular flange portion 214 provided on the plunger member so as to bias both the plunger and associated abutting lock cylinder 200 in an outward direction. An axially elongated slot or notch 216 is provided in the sidewall of bore 198 which terminates at its forward or inner end at a deeper recess 218. Slot 216 and recess 218 are designed to receive the radially outwardly projecting locking tab 220 provided on lock cylinder 200 so as to retain lock cylinder 200 when in an unlocked condition as well as to cooperate therewith for locking same in an inwardly disposed position as shown.

Preferably, plunger 202 will be of a generally elongated cylindrical shape with the inner end 208 thereof provided with a generally conically shaped projection 222 which serves as a pilot to facilitate movement of the end portion 208 of plunger 202 into the recess provided in the outer surface of housing 172.

Preferably, housing 194 will be fabricated in two pieces 194(a) and 194(b) with the parting line thereof extending along the axis of the shift lever 168. Suitable fasteners such as torque limiting threaded fasteners 224 may be utilized to secure the two halves together in surrounding relationship to the shift lever 168. In order to lock the assembled housing 194 to the shift lever 168, a pair of torque limiting set screws 226 may be employed. As used herein torque limiting fasteners and set screws are intended to refer to fasteners wherein a driving head portion is designed to shear off when the fastener has been subjected to a predetermined torque. Preferably, these fasteners will be designed to shear below the surface of housing 194 after which the remaining openings may be filled with a suitable polymeric composition. In this manner, not only will the installed lock assembly present a pleasing finished assembly but removal thereof will be rendered virtually impossible.

Figure 16:
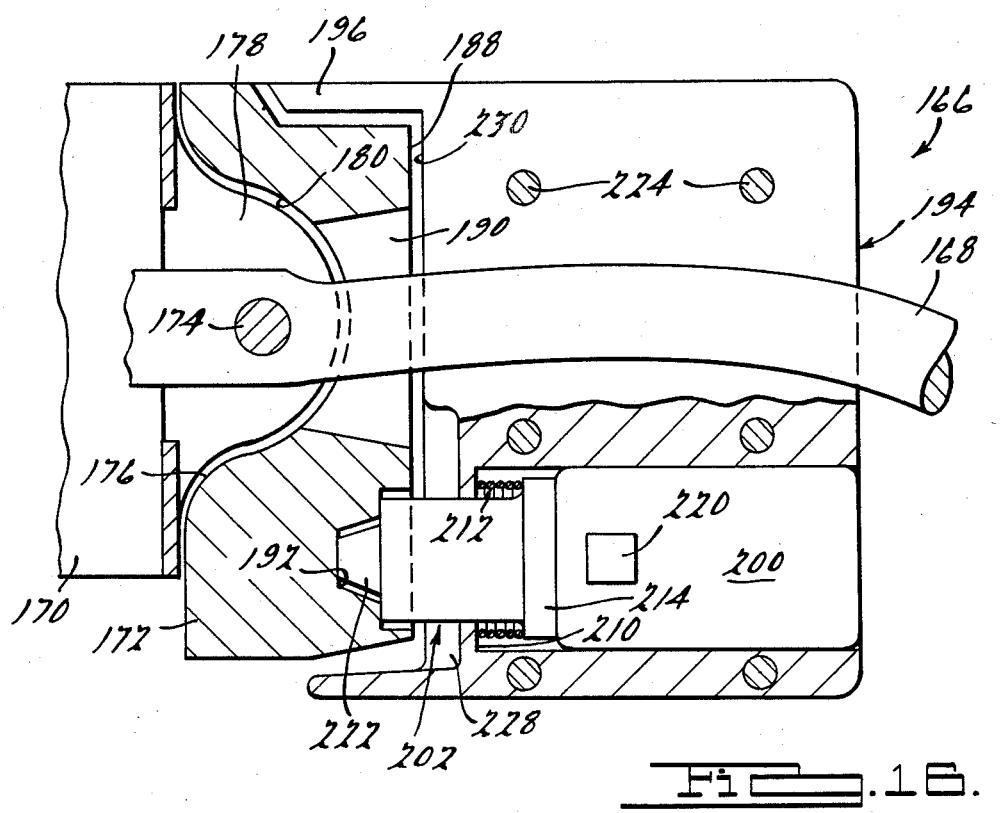
FIG. 16 is an elevational view of another embodiment of the present invention with portions thereof being shown in section.
Figure 17:
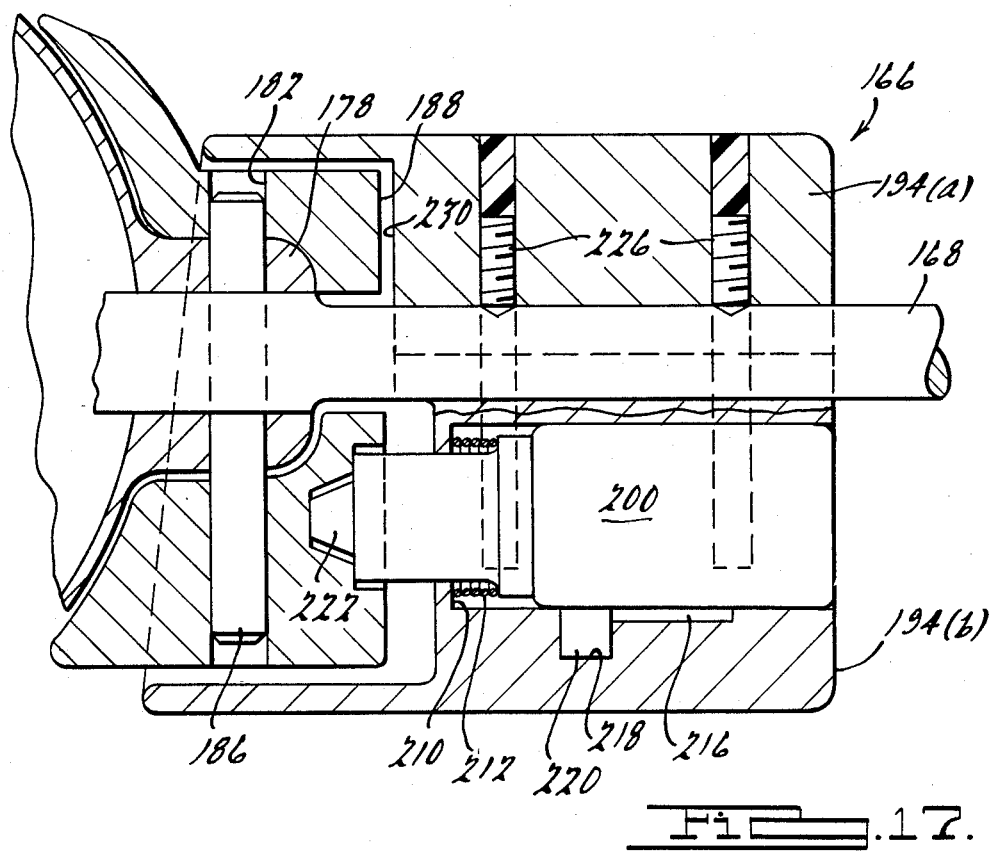
FIG. 17 is a section view of the embodiment shown in FIG. 16, the section being taken along a plane extending at a right angle to the axis of a vehicle steering column.

When in a locked position as shown in FIG. 16, plunger 202 will extend into opening 192 provided in housing 172 and bear against the bottom thereof so as to prevent pivotal movement of shift lever 168. In order to release the lock mechanism of the present invention, tab portion 220 of lock cylinder 200 is withdrawn from recess 218 whereby lock cylinder 200 and plunger 202 will move to the right as shown under the biasing action of spring 212. With end portion 208 of plunger 202 withdrawn from opening 192, it will then be possible to pivot shift lever 168 about pivot pin 174 so as to release the vehicle shift mechanism. A suitably sized access 228 is provided on the inner surface 230 of housing 194 so as to provide a suitable clearance for the relative movement between housings 172 and 194 as the shift lever 168 is pivoted.

Accordingly, as is now apparent, the present invention provides an extremely reliable locking device for preventing operation of vehicle shift mechanisms thereby offering the vehicle owner an effective deterrent to the possible theft of his vehicle. The locking apparatus of the present invention is well suited for a wide variety of applications utilizing standard basic components depending upon the type of shift mechanism utilized on the vehicle and requiring only selection of the proper size adapter member.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. In a motor vehicle having a shift mechanism including a releasable latch mechanism for retaining the shift lever in a preselected position, an improved locking mechanism for preventing movement of said shift lever from said preselected position, said lock system being characterized by:

a handle member having a bore provided therein;

a universal adapter member disposed within said bore and including an opening in one end thereof adapted to telescopically receive an end portion of said shift lever;

means for securing said universal adapter to said shift lever; and selectively actuable locking means disposed within said handle member, said locking means, said locking means including a portion extending through an opening provided in said universal adapter adjacent the other end thereof so as to be operable to mechanically interlock said universal adapter and said handle member in assembled relationship and to selectively prevent release of said latching mechanism.

2. A lock system as set forth in claim 1 wherein said opening in said universal adapter is sized in accordance with an outside diameter of said shift lever whereby said lock system may be fitted to a wide variety of motor vehicles.

3. A lock system as set forth in claim 1 wherein said locking means includes a locking cylinder movably disposed within said bore and having a radially outwardly projecting tab portion, said tab portion being operable to mechanically interlock said handle and said universal adapter.

4. A lock system as set forth in claim 3 wherein said shift lever is hollow and said shift mechanism further includes a rod member projecting upwardly through said hollow shift lever, said rod member being upwardly spring biased and forming a part of said latching mechanism, said lock system further comprising means for moving said rod inwardly with respect to said shift lever in response to movement of said locking cylinder.

5. A lock system as set forth in claim 4 wherein said means for moving said rod comprise a plunger member disposed between said rod and said cylinder, said rod acting against said plunger whereby said locking cylinder is normally biased into a position projecting outwardly from said handle member, movement of said locking cylinder into said handle member being operable to effect movement of said rod.

6. A lock system as set forth in claim 4 wherein said plunger is secured to said rod.

7. A lock system as set forth in claim 5 further comprising a tab portion on said locking cylinder, said tab portion being radially movable with respect to said cylinder and selectively receivable within a recess provided in said handle member to prevent movement of said cylinder and said plunger.

8. A lock system as set forth in claim 7 wherein said handle member is generally T-shaped, said locking means includes a cylinder projecting laterally outwardly from one arm thereof and said plunger member being movably positioned within said handle member, said plunger extending through a diametric opening in said universal adapter so as to mechanically interlock said universal adapter within said handle.

9. A lock system as set forth in claim 8 wherein said locking mechanism includes a cam member engageable with the end of said rod, said cam member being operable in response to movement of said plunger member to effect movement of said rod member into said shift lever.

10. A lock system as set forth in claim 1 wherein said means for securing said universal adapter to said shift lever are concealed by said handle member when said locking system is fully assembled.

11. A lock system as set forth in claim 10 wherein said securing means comprise set screws provided in said universal adapter and engageable with said shift lever.

12. A lock system as set forth in claim 10 wherein said shift lever includes an annular groove adjacent an upper end thereof, said lock system being further characterized by said securing means comprising a member received with a chordally extending opening in said universal adapter, said opening being aligned with said annular groove and said member being partially received in said annular groove provided on said shift lever.

13. A lock system as set forth in claim 10 wherein said universal adapter includes a non-circular peripheral surface portion adapted to be received in a complementary shaped non-circular portion of said bore in said handle whereby relative rotation between said handle and said shift lever is prevented.

14. A lock system as set forth in claim 10 wherein said universal adapter further includes means cooperable with said handle member to prevent axial movement of said handle member with respect to said universal adapter.

15. In a motor vehicle having a shift mechanism including a releasable latch mechanism for retaining the shift lever in a preselected position, an improved locking mechanism for preventing movement of said shift lever from said preselected position, said lock system being characterized by:

a handle member having a bore provided therein;

an elongated hollow universal adapter member disposed within said bore, said universal adapter having an opening in one end thereof for telescopically receiving said shift lever;

securing means provided on said universal adapter for securing same to said shift lever, said handle member being adapted to overlie and prevent access to said securing means when assembled to said universal adapter; and a locking mechanism movably disposed in part within said universal adapter and being selectively operable to prevent release of said latching mechanism, said locking mechanism including means projecting through a sidewall of said universal adapter and into a receiving portion provided within said handle member to thereby mechanically interlock said universal adapter and said handle member in assembled relationship.

16. A lock system as set forth in claim 15 wherein said universal adapters are fabricated with openings of different sizes to accommodate different sized shift levers whereby said locking system may be fitted to a wide variety of vehicles by merely selecting a universal adapter having an appropriately sized opening.

* * * * *

UNITED STATES PATENT AND TRADEMARK OFFICE
CERTIFICATE OF CORRECTION

PATENT NO. : 4,747,278
DATED : May 31, 1988
INVENTOR(S) : Paul E. Roncelli, deceased et al It is certified that error appears in the above-identified patent and that said Letters Patent is hereby corrected as shown below:

ON THE TITLE PAGE, under "Inventors"
"Bernadette" should be --Bernedette--.

Column 3, line 11, after "shown" insert --therein--.

Column 6, line 17, "inteconnected" should be --interconnected--.

Column 7, line 21, "sited" should be --suited--.

Column 7, line 42, delete "the" and insert --with--.

Column 9, line 17, "an" (first occurrence) should be --and--.

Column 9, line 68, "access" should be --recess--.

Column 10, line 37, Claim 1, delete "said locking means,"

Column 11, line 4, Claim 6, "4" should be --5--.

Signed and Sealed this

Fifteenth Day of November, 1988

Attest:

DONALD J. QUIGG

*Attesting Officer*         *Commissioner of Patents and Trademarks*